(12) United States Patent
Gunton

(10) Patent No.: US 7,005,884 B2
(45) Date of Patent: Feb. 28, 2006

(54) MONITORING APPARATUS FOR MONITORING ELECTRICAL DRIVE CURRENT FOR AN ELECTRIC MOTOR

(76) Inventor: Bruce Stanley Gunton, 3 Gisborne Close, Yoxall, Staffordshire DB13 8NU (GB)

(*) Notice: Subject to any disclaimer, the term of this patent is extended or adjusted under 35 U.S.C. 154(b) by 58 days.

(21) Appl. No.: 10/476,019

(22) PCT Filed: Apr. 30, 2002

(86) PCT No.: PCT/GB02/01957

§ 371 (c)(1),
(2), (4) Date: Oct. 23, 2003

(87) PCT Pub. No.: WO02/089284

PCT Pub. Date: Nov. 7, 2002

(65) Prior Publication Data

US 2004/0135583 A1    Jul. 15, 2004

(30) Foreign Application Priority Data

May 1, 2001   (GB) .................................. 0110634

(51) Int. Cl.
*G01R 31/34* (2006.01)

(52) U.S. Cl. .................. 324/772; 324/158.1; 324/537

(58) Field of Classification Search ................ 324/772, 324/158.1, 537; 116/28 R, 35 R, 36, 42, 116/1, 86; 340/500, 545.4, 545.1–2, 545.9; 318/538, 491, 493–494
See application file for complete search history.

(56) References Cited

U.S. PATENT DOCUMENTS

| | | | | |
|---|---|---|---|---|
| 5,018,041 A | * | 5/1991 | Szepesi | 361/18 |
| 5,115,188 A | * | 5/1992 | Norton | 323/365 |
| 5,374,857 A | * | 12/1994 | Carobolante | 327/110 |
| 5,599,301 A | * | 2/1997 | Jacobs et al. | 604/65 |
| 5,663,620 A | | 9/1997 | Mizuno et al. | 318/283 |
| 5,774,323 A | * | 6/1998 | Innes et al. | 361/187 |

FOREIGN PATENT DOCUMENTS

DE      100 28 445      12/2001

* cited by examiner

Primary Examiner—Paresh Patel
(74) Attorney, Agent, or Firm—Smith-Hill and Bedell

(57) ABSTRACT

Monitoring apparatus is for monitoring a parameter, such as a drive current to a motor. Motor current flows through a series resistor which provides a voltage signal which varies in response to variations in the motor current. An analysis circuit is operable to analyze the rate of change of the voltage and to provide an alarm signal in the event that the rate of change continues in excess of predetermined rate for a period in excess of a predetermined time. The alarm signal could, for example, be used to indicate that an automatic door being driven by the motor has been blocked by a person or object which could be injured or damaged.

10 Claims, 3 Drawing Sheets

MONITORING APPARATUS FOR MONITORING ELECTRICAL DRIVE CURRENT FOR AN ELECTRIC MOTOR

CROSS REFERENCE TO RELATED APPLICATION

This is a national stage application filed under 35 USC 371 based on International Application No. PCT/GB2002/001957 filed Apr. 30, 2002, and claims priority under 35 USC 119 of United Kingdom Patent Application No. 0110634.3 filed May 1, 2001.

The present invention relates to monitoring apparatus and in particular, but not exclusively, to apparatus for monitoring electrical current, such as drive current for an electric motor.

In many situations, it is necessary to monitor drive current to an electric motor, for instance to check for faults or other operating problems. In the case of an electrically driven door, for instance, it is desirable to detect an obstruction, in view of the possible safety implications. It has previously been proposed to monitor motor current in order to detect an obstruction The present invention provides monitoring apparatus for monitoring a parameter, comprising signal generating means operable to provide a signal which varies in response to variations in the parameter being monitored, and analysis means operable to analyse the rate of change of the value and to provide an alarm signal in the event that the rate of change continues in excess of a predetermined rate for a period in excess of a predetermined time.

Preferably the parameter is an electrical current. The parameter may be a motor current.

The signal is preferably a voltage derived from the parameter. The parameter may be a current flowing through an impedance to create a voltage. The voltage may be derived by means of a sensefet device.

The apparatus may include sensor means operable to provide to the analysis means a digital signal representing the value. The analysis means is preferably operable to store periodically the value of the signal, and to analyse the rate of change by reference to a sequence of stored values. The analysis means may include a microprocessor or microcontroller programmed to perform analysis as aforesaid.

Alternatively, the analysis means may include differentiator means operable to differentiate the signal. Preferably comparator means are provided, operable to compare the output of the differentiator means with a threshold value. Timer means may be provided to measure the length of time for which the output of the differentiator means exceeds a threshold value.

Examples of the present invention will now be described in more detail, by way of example only, and with reference to the accompanying drawings, in which.

Figure 1:
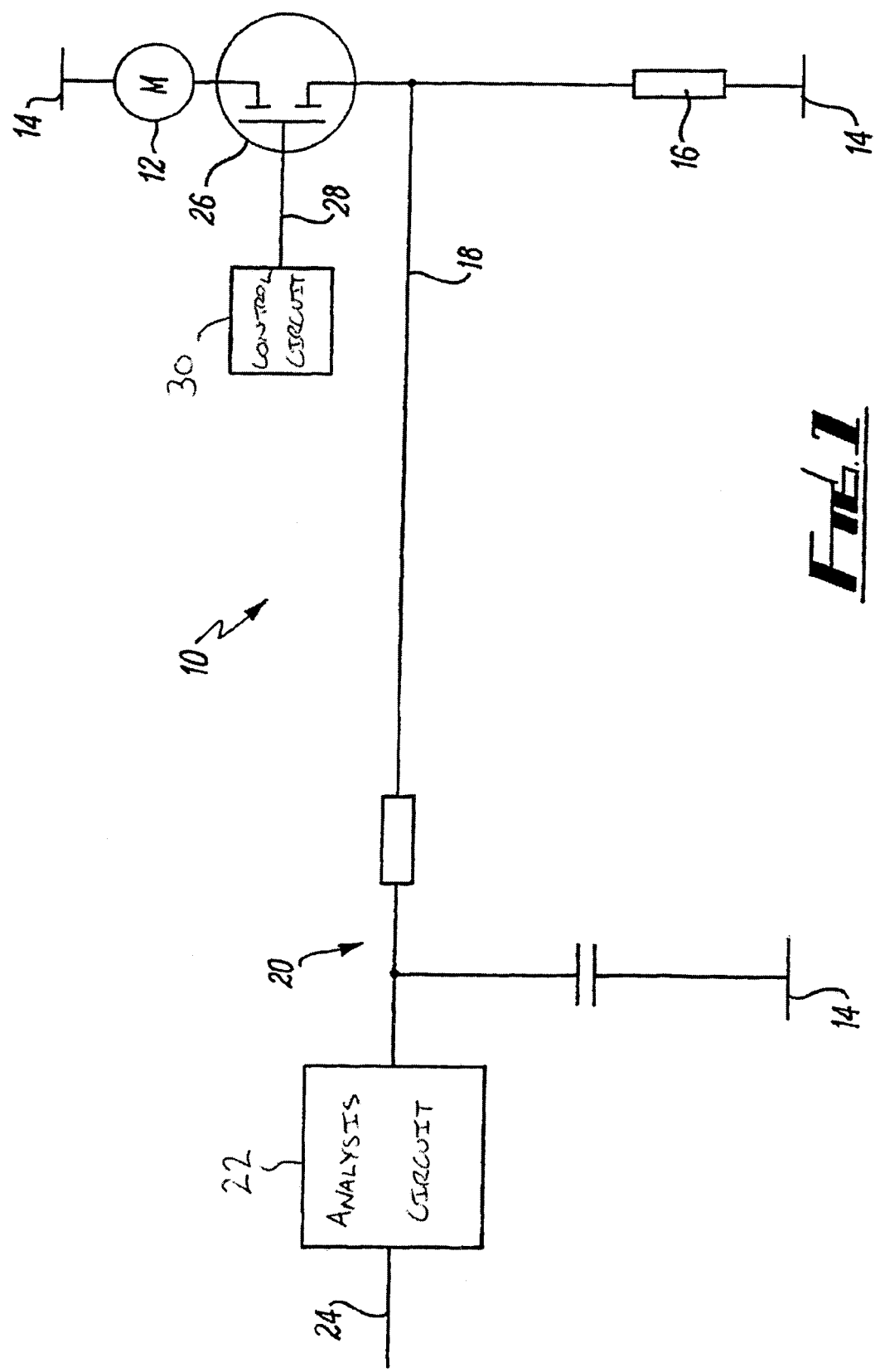
FIG. 1 is a schematic circuit diagram of a first embodiment of the present invention.

FIG. 1 illustrates monitoring apparatus 10 for monitoring a parameter which, in this example, is drive current to a motor 12, the current flowing between supply rails 14. Motor current flows through a series resistor 16 which provides a voltage signal at 18, varying in response to variations in the current through the resistor 16, and hence through the motor 12. The voltage signal at 18 is filtered by an RC filter at 20 before reaching an analysis circuit 22. The details of the analysis circuit 22 will be described below. The circuit 22 is operable to analyze the rate of change of the voltage signal at 18 and to provide an alarm signal at 24 in the event that the rate of change continues in excess of a predetermined rate for a period in excess of a predetermined time.

In more detail the motor 12 may be, for example, a drive motor driving a door, shutter or other access control mechanism, allowing the mechanism to be opened or closed. Motor current is controlled by a device at 26, which may be a MOSFET power transistor having a gate 28 controlled by a control circuit 30 in order to control the drive current to the motor 12. Details of the manner in which the control circuit 30 operates do not themselves form part of the present invention.

Motor current flows through the channel of the transistor 26, with which the resistor 16 is in series, so that the voltage at 18 rises and falls with the motor current. This voltage signal will, in many practical situations, exhibit noise. The purpose of the filter 20 is to reduce or eliminate noise which could affect the operation of the analysis circuit 22. The filter 20 is shown as a simple RC filter, but many other filter designs could be used, according to the nature of the expected noise, and the sensitivity of the analysis circuit. Filtering may be dispensed with, if the voltage signal at 18 is not expected to exhibit noise but it is expected that in practice, filtering is likely to be required.

Figure 2:
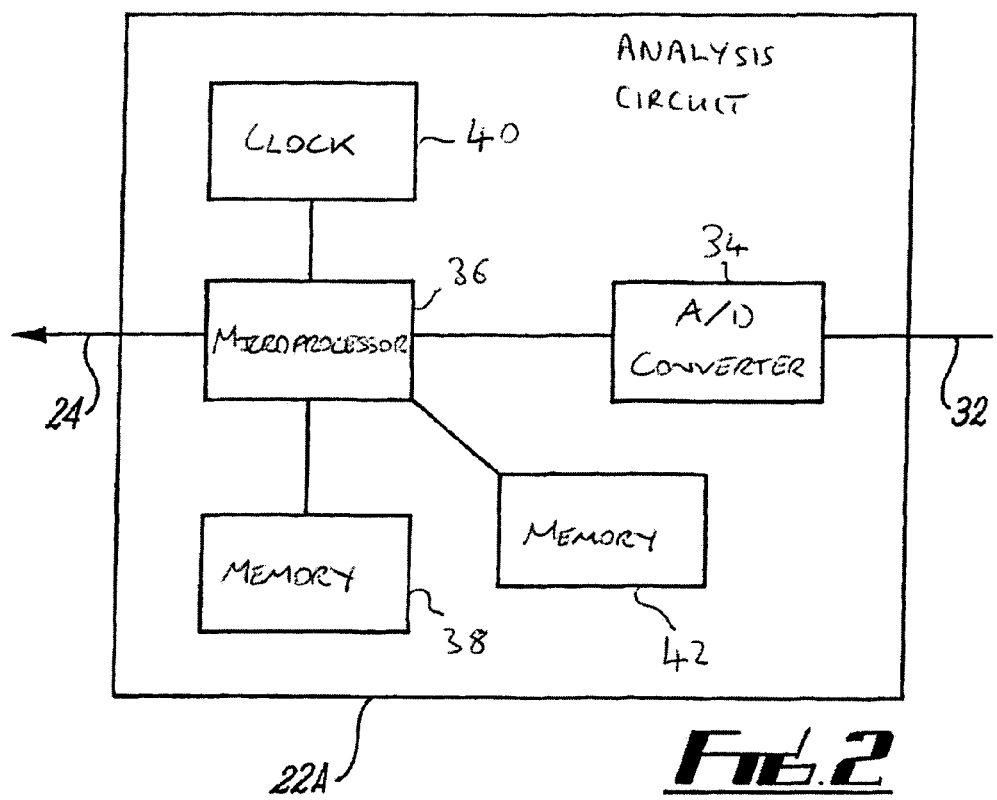
FIGS. 2 and 3 are schematic block diagrams of analysis means for use in the arrangement of FIGS. 1 or 4.
Figure 3:
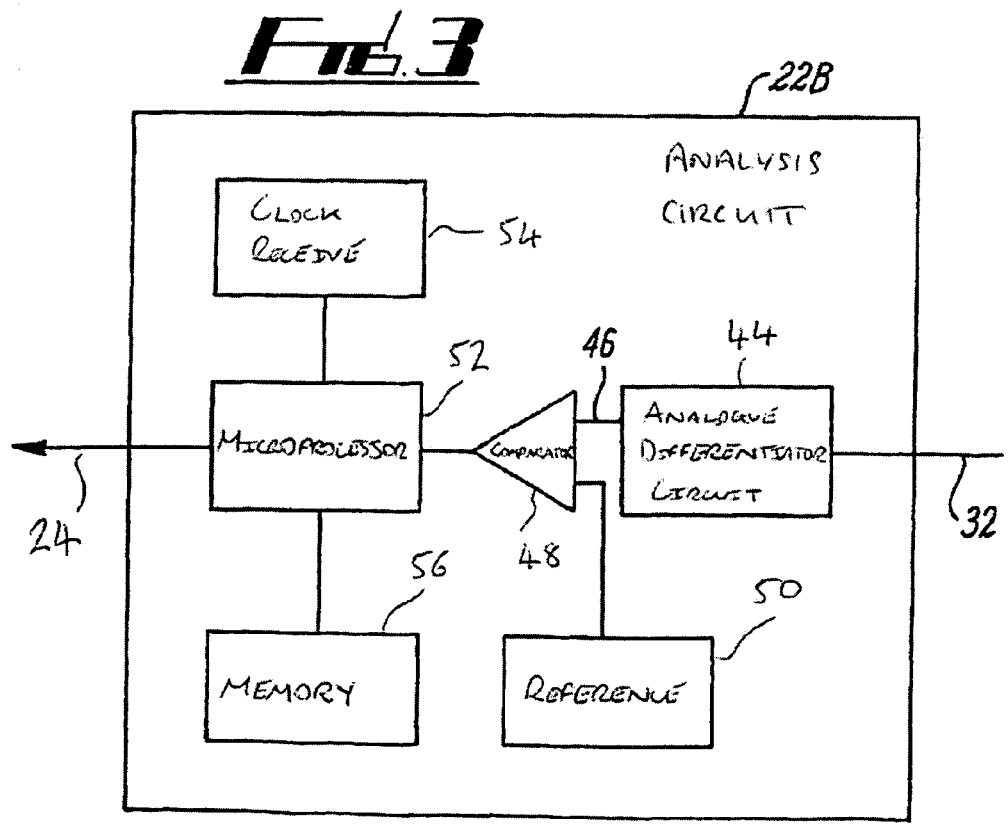

Two examples of analysis circuits 22A,22B are illustrated in FIGS. 2 and 3. Each receives an input at 32, which is the voltage signal at 18, filtered. Each circuit 22A,B is operable, when appropriate, to issue an alarm signal at the output 24. The circuit 22A of FIG. 2 provides analysis in a digital manner, whereas the circuit 22B of FIG. 3 provides analysis in an analogue manner.

In the circuit 22A, the input 32 is received by an analogue-to-digital converter 34 which passes a digital representation of the voltage at 32 to the principal analysis circuit 36, which may be a microprocessor or microcontroller running under appropriate software control. It will be readily apparent to the skilled reader that some or all of the functions illustrated by discrete blocks in FIG. 2 could be implemented within the microprocessor 36, or by discrete circuits, or the complete circuit 22A could be implemented by discrete circuits.

The microprocessor 36 analyses the values received from the converter 34, periodically recording the reported value in memory 38, the microprocessor 36 being provided with appropriate timing signals by a dock circuit 40. Additional memory at 42 records two values required by the microprocessor 36 in the course of its analysis. The first of these values is a threshold value for the rate of change of the value reported by the converter 34. The second value is a threshold value for a period of time.

When the circuit 22A is in use, motor current 12 will vary according to working conditions. For instance, motor current may be high when door movement is initiated, until inertia in the system is overcome. The current may also change as the door opens, according to the torque required at various stages of the door movement. As these changes occur, the voltage signal 18 will rise or fall and thus, the digital values reported to the microprocessor 36 by the converter 34 will be a series representing the rising or falling signal 18. In many applications of the motor 12, during normal use, variations in the voltage signal 18 will be expected and may be quite wide. However, they will be relatively slow or short-lived. For instance, torque requirements arising from the motion of the door will steadily change as the door moves through its range of motion and thus produce a slowly changing voltage signal 18. A feature such as a bump on a track along which the door is moving, may give rise to a significant increase in torque requirement (and thus motor current), but only for a brief period of time, until the bump has been negotiated.

In the event that a change in torque demand is experienced, the microprocessor 36 will record a changing series of values in the memory 38. Consequently, by analysing a series of values stored in the memory 38, the microprocessor 36 can calculate the rate of change over a particular period and compare this with a threshold rate of change recorded in the memory 42. An appropriate choice of the value stored in the memory 42 will ensure that during normal use of the door, expected torque changes will not result in a rate of change which is in excess of the predetermined rate stored in the memory 42.

In the event that a bump on the track is encountered, the torque change may be significant and thus, the microprocessor 36 will find that a recent series of measurements in the memory 38 indicate a rate of change in excess of the threshold rate stored in the memory 42. However, a bump on the track would normally produce a short spike in the motor current so that, although the microprocessor 36 would find the rate of change to be in excess of the threshold, the microprocessor 36 also would find that the excessive rate of change does not continue for a time in excess of the predetermined time also stored in the memory 42. Consequently, neither a large but slow change in motor current, nor a fast but short change in current will cause the converter 34 to judge that both criteria stored in the memory 42 have been exceeded and consequently, no alarm signal will be provided at 24.

However, in the event that the door is blocked, such as by a person or object which could be injured or damaged, the torque demand on the motor would begin to increase rapidly and would continue to increase. In this situation, the microprocessor 36 would therefore see a series of stored values in the memory 38, representing a rate of change in excess of the predetermined rate stored in the memory 42, and continuing for a period in excess of the predetermined time, also stored in the memory 42. Consequently, both conditions would be adjudged to be fulfilled, and an alarm output would be provided at 24. This may operate to disable the control circuit 30, so that the motor 12 is disabled, and may also produce an alarm to alert an operator.

The circuit 22B of FIG. 3 operates to similar effect, in an analogue manner. The input at 32 is applied to an analogue differentiator circuit 44, such as a simple circuit based around an operational amplifier. This produces an output at 46 representing the value of the differential and thus representing the rate of change of the input 32. This is applied to one input of a comparator 48, the other input of which is provided with a reference value from 50, representing the threshold rate of change above which the measured rate of change is required to be for the sounding of an alarm.

The output of the comparator 48 is read by a microprocessor 52 which also receives clock signals at 54. Consequently, when the rate of change of the input 32 rises above the threshold value set from 50, the output of the comparator 48 will change state. This will be sensed by the microprocessor 52, which can then commence timing that change of state. If the comparator state reverts before the expiry of a predetermined time (set by a value in memory 56), no action is required. However, in the event that the rate of change exceeds the threshold value from 50 for a period in excess of the predetermined time, the microprocessor 52 adjudges that a blockage or other unacceptable fault exists, and issues an alarm signal at 24. Again, this may be used to disable the control 30, to disable the motor 12, and may also be used to alert an operator.

Figure 4:
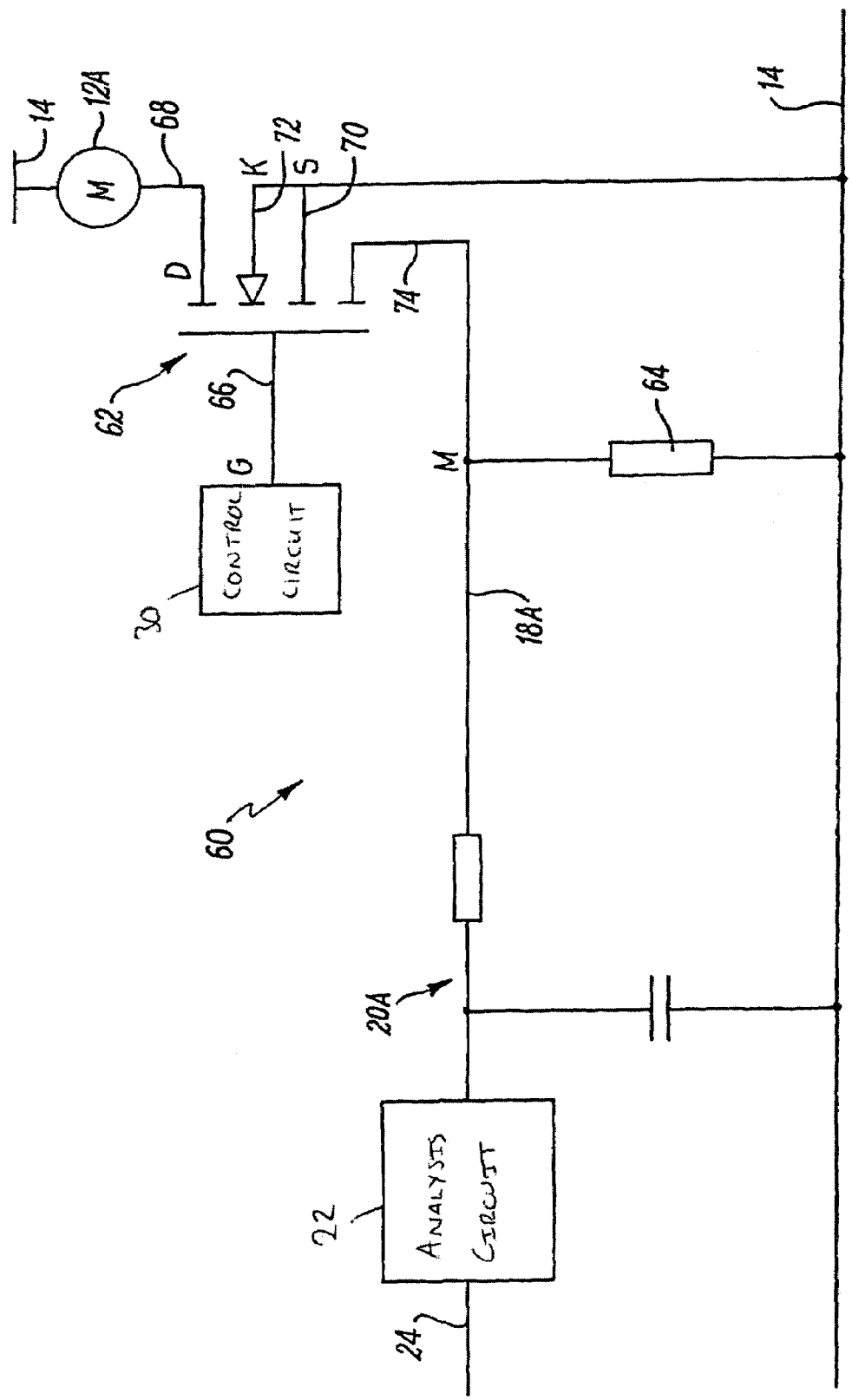
FIG. 4 is a schematic circuit diagram of a second embodiment.

FIG. 4 illustrates a second embodiment which differs from the arrangement of FIG. 1 in relation to the manner of obtaining a signal which varies in response to the parameter being monitored. The apparatus 60 is again used to monitor drive current to a motor 12A, to provide a voltage signal at 18A which is then filtered at 20A and applied to an analysis circuit 22, which may be built in accordance with either alternative described above. The voltage signal 18A is derived from motor current by means of a semi-conductor device 62, which is a sensefet working in conjunction with a resistor 64, as can now be described.

A sensefet is a type of FET power transistor which is provided with a current sensing capability. One example of a sensefet is the transistor device manufactured by Motorola under their reference MTP40N06M.

The sensefet 62 has a gate 66, drain 68 and source 70, as is conventional in an FET, and has two additional terminals associated with the channel, namely a "kelvin" terminal 72, and a "mirror" terminal 74. In the circuit of FIG. 4, the kelvin terminal 72 is connected to the source 70. The mirror terminal 74 is used to provide the voltage signal 18A. This is achieved by connecting the resistor 64 between the mirror terminal 74 and the source 70. In brief, the sensefet 62 is constructed so that the drain current (and hence the motor current) is split within the device to provide a small (but known) fraction of the current at the mirror 74, the remainder being provided at the source 70. Coupling a resistor 64 between the mirror 74 and source 70 is found to disturb this ratio somewhat, but in a manner which remains predictable for low values of the resistor 64 and consequently, provides a voltage signal 18A which is predictably related to the motor current. Consequently, this voltage signal 18A can be used as the input to an analysis arrangement of any of the types described above. Thus, the ability to turn motor current on or off, and to sense that current, are both provided within a single semiconductor device.

In many typical applications, such as motor control of a roller shutter, garage door or the like, nominal motor current may be in the region of 5 A, but varying between about 3 A and about 6 A during normal operation. Short spikes in the motor current may arise, such as from bumps or other discontinuities on the door track but these might typically last for no more than 6 ms and give rise to a current increase up to ½ A. Consequently, using these figures as examples, the value of resistors 16,64 and of thresholds stored within the analysis circuits 22 would be set, for instance, to detect a current rise with a rate in excess of ½ A in 6 ms, and remaining at or above this rate for a duration in excess of 6 ms.

Many variations and modifications can be made to the apparatus described above, without departing from the scope of the present invention. In particular, many different values, component values and circuit details could be used, in accordance with the particular application for which the motor is intended, expected normal motor currents and rates of change and the like. Very many variations could be made in relation to the implementation as between hardware and software, particularly in relation to the analysis circuit.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. Monitoring apparatus for monitoring electrical drive current for an electric motor, comprising signal generating means operable to provide a signal which varies in response to variations in the drive current, and analysis means operable to analyze the signal to determine the rate of change of the drive current and to provide an alarm signal in the event that the rate of change of the drive current continues to be in excess of a predetermined rate for a period which is in excess of a predetermined time.

2. Monitoring apparatus according to claim 1, wherein the signal is a voltage derived from the drive current.

3. Monitoring apparatus according to claim 1, wherein the voltage is derived from at least part of the current flowing through an impedance.

4. Monitoring apparatus according to claim 3, wherein said part of the drive current is derived by means of a sensefet device.

5. Monitoring apparatus according to claim 1, wherein the apparatus includes sensor means operable to provide to the analysis means a digital signal representing the value.

6. Monitoring apparatus according to claim 1, wherein the analysis means is operable to store periodically the value of the signal, and to analyze the rate of change by reference to a sequence of stored values.

7. Monitoring apparatus according to claim 1, wherein the analysis means includes a microprocessor or microcontroller programmed to perform analysis as aforesaid.

8. Monitoring apparatus according to claim 1, wherein the analysis means includes differentiator means operable to differentiate the signal.

9. Monitoring means according to claim 8, wherein comparator means are provided, operable to compare the output of the differentiator means with a threshold value.

10. Monitoring apparatus according to claim 8, wherein timer means are provided to measure the length of time for which the output of the differentiator means exceeds a threshold value.

* * * * *